United States Patent
Gure et al.

(10) Patent No.: US 6,220,655 B1
(45) Date of Patent: Apr. 24, 2001

(54) FORWARD STRUCTURE FOR A SELF-SUPPORTING BODY SHELL OF A PASSENGER CAR AND METHOD OF MAKING SAME

(75) Inventors: Dietmar Gure, Grafenau; Dieter Lange, Magstadt, both of (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/455,801

(22) Filed: Dec. 7, 1999

(30) Foreign Application Priority Data

Dec. 17, 1998 (DE) .............................................. 198 58 303

(51) Int. Cl.⁷ ........................................................ B60J 7/00
(52) U.S. Cl. .................... 296/203.02; 296/187; 296/189; 296/194; 296/196; 296/197; 296/204
(58) Field of Search ...................... 296/187, 189, 296/194, 196, 197, 204, 203.02; 280/781, 784, 785

(56) References Cited

U.S. PATENT DOCUMENTS 3,940,176 * 2/1976 Ito et al. ............................ 296/28 F
4,955,663 * 9/1990 Imura ................................. 296/194
5,772,245 * 6/1998 Mülhausen ........................ 280/784
5,882,039 * 3/1999 Beckman et al. .................. 280/781
5,884,722 * 3/1999 Durand et al. ..................... 180/312

* cited by examiner

Primary Examiner—Joseph D. Pape
Assistant Examiner—Mickki D. Murray
(74) Attorney, Agent, or Firm—Evenson, McKeown, Edwards & Lenahan, P.L.L.C.

(57) ABSTRACT

A forward structure for a self-supporting body shell of a passenger car has two forward structure side members, with which a function carrier is connected on at least four fastening points in a force-transmitting manner, the function carrier being constructed of two cross member sections and two side member sections. The function carrier is designed as a one-piece cast component. The cross member sections and the side member sections are provided with a U-shaped shell profile which is open in the downward direction. Each side member section is provided with at least one geometrically caused desired deformation area which, in the event of a deformation of the forward structure side member in the longitudinal direction of the vehicle, can be additionally plastically deformed.

17 Claims, 1 Drawing Sheet

FORWARD STRUCTURE FOR A SELF-SUPPORTING BODY SHELL OF A PASSENGER CAR AND METHOD OF MAKING SAME

BACKGROUND AND SUMMARY OF THE INVENTION

This application claims the priority of German application 198 58 303.6, filed on Dec. 17, 1998, the disclosure of which is expressly incorporated by reference herein.

The invention relates to a forward structure for a self-supporting body shell of a passenger car, having two forward structure side members by means of which a function carrier is connected to at least four fastenings points in a force-transmitting manner, the function carrier being constructed of two cross member sections and two side member sections.

Such a forward structure is generally known for Mercedes-Benz passenger cars. The forward structure has two forward structure side members on whose underside an integral carrier serving as a function carrier is fastened by means of two fastening points respectively spaced with respect to one another in the longitudinal direction of the vehicle. The integral carrier carries a drive assembly as well as other vehicle function units. In the event of a frontal impact of a passenger car provided with such an integral carrier, a blocking may occur which reduces the energy absorbing capacity of the forward structure.

In order to avoid this, it is also known to design the two—viewed in the normal driving direction—rearward fastening points of the integral carrier such that they can be sheared off at the forward structure side members, and so that the integral carrier is separated at the fastening points from the forward structure in the event of a corresponding frontal impact and can therefore no longer cause a blocking.

It is an object of the invention to provide a forward structure of the initially mentioned type which, in comparison to the prior art, permits a further improved energy absorption in the event of a vehicle impact.

This object is achieved in that the function carrier is designed as a one-piece component which can be deformed at least in sections, in which case each side member section is provided with at least one geometrically caused desired deformation area which, in the event of a deformation of the forward structure side member in the longitudinal direction of the vehicle, can be plastically deformed. As a result, it is advantageously ensured that, in addition to the forward structure side members, the function carrier is also used for absorbing energy in the event of a corresponding vehicle impact. The function carrier can particularly be designed as a subframe or as an integral carrier and thus carry a chassis, a drive assembly and/or front axle parts. In this case, it is sufficient according to the invention if, during a corresponding forward structure deformation, the function carrier contributes to the supplementary energy absorption only along a portion of the deformation path and subsequently breaks since, because of the existing deformation on the function carrier, the occurred fracture is clearly the result of this deformation so that, with respect to product liability reasons, no difficulties will arise when the causes are examined. The energy absorbing capability, as a whole, which was increased by the additional energy absorption of the function carrier, in the area of an occupant compartment of the body shell, will result in a reduced leg space intrusion. In the side member area, the function carrier is preferably provided with a bend which is offset in a Z-shape and which represents the geometrically caused desired deformation area.

The geometrically caused desired deformation area also forces a function carrier made of a non-ductile material under the influence of longitudinal force to carry out a deformation and therefore absorb energy.

In a further development of the invention, the component is produced as a cast component made of a metal material which has such a high ductility that, in the event of corresponding loads onto the forward structure, plastic deformations of the cast component in the desired deformation areas will occur before there is a breakage of the material. As mentioned above, this further development is advantageous for product liability reasons.

In a further development of the invention, as the desired deformation area, each side member section is provided with a bent area which is vertically offset in a Z-shape. This is a particularly advantageous further development for achieving targeted deformations of the function carrier. The deformability is the result of the geometrical design which causes a folding or upsetting of the side member sections in the event of corresponding deformations.

In a further development of the invention, the function carrier is screwed from the underside to the forward structure side members, the side member sections being positioned below the forward structure side members.

Additional advantages and characteristics of the invention are contained in the claims as well as in the following description of a preferred embodiment of the invention which is illustrated by means of the drawings.

Other objects, advantages and novel features of the present invention will become apparent from the following detailed description of the invention when considered in conjunction with the accompanying drawings.

DETAILED DESCRIPTION OF THE DRAWINGS

Figure 1:
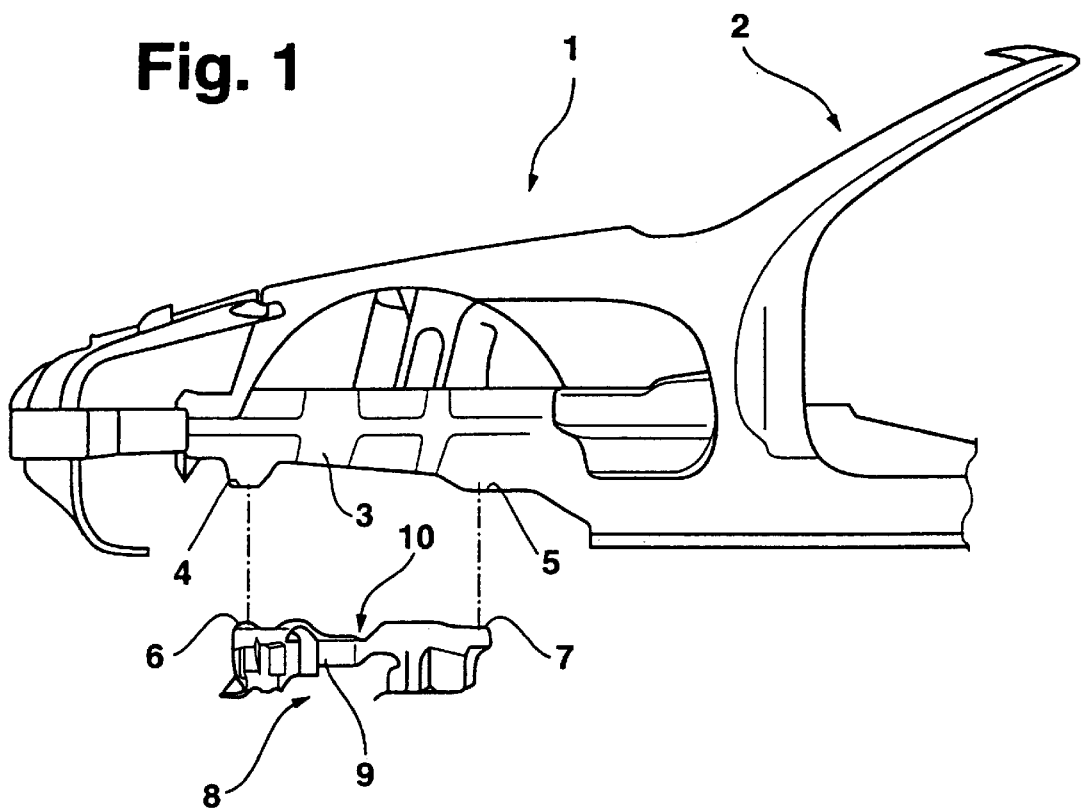
FIG. 1 is a lateral exploded view of an embodiment of a forward structure according to the invention which has a function carrier to be connected.

A passenger car has a self-supporting body shell which, according to FIG. 1, is provided with a forward structure 1. Viewed in the normal driving direction, the forward body structure 1 is followed toward the rear by an occupant compartment 2. The passenger car may have an open or closed design. The forward structure 1 has two forward structure side members 3 which extend in the longitudinal direction of the vehicle and which are each provided on their undersides with two receiving areas 4, 5 for the fastening of a function carrier 8 which are spaced with respect to one another in the longitudinal direction of the vehicle.

In the illustrated embodiment, the function carrier 8 is further developed for receiving a drive assembly as well as for receiving chassis function units. It therefore forms, on the one hand, an integral carrier and, on the other hand, a subframe. In embodiments of the invention which are not shown, the function carrier 8 may, however, also be further developed for receiving only a single corresponding function unit or for receiving several vehicle function units of different designs.

Figure 2:
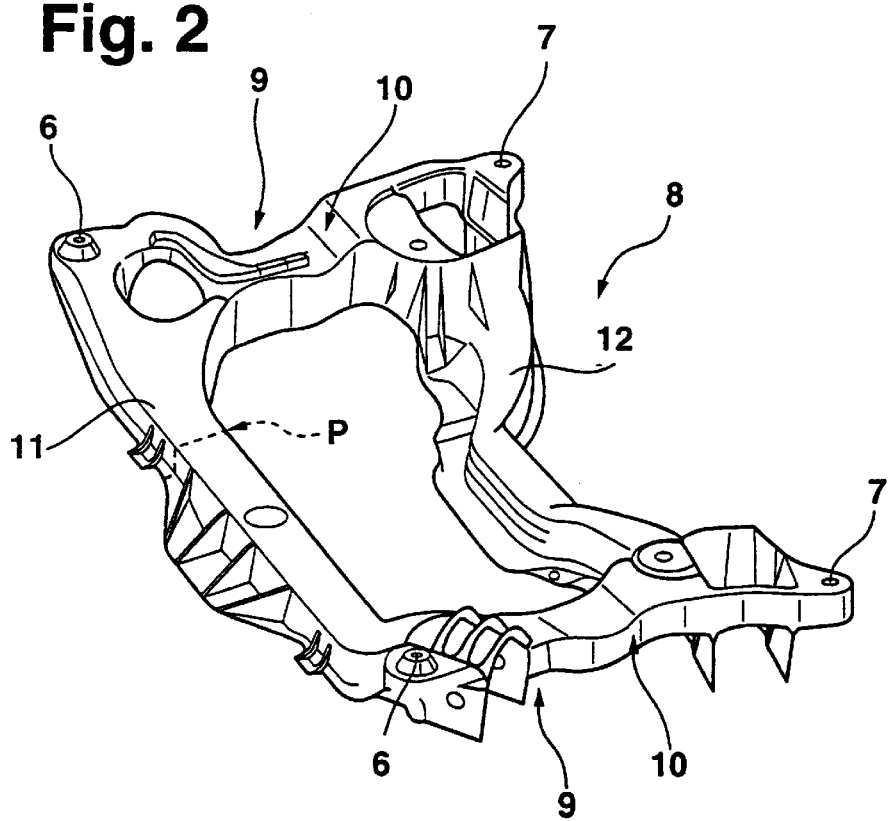
FIG. 2 is an enlarged perspective representation of the function carrier according to FIG. 1.

The function carrier 8 is designed as a one-piece metal cast component and has a forward cross member section 11, two leg sections in the form of lateral side member sections 9 which adjoin the forward cross member section 11, as well as another rearward cross member section 12 which connects the side member sections 9 with one another on the rear side. The two cross member sections 11, 12 as well as the side member sections 9 are designed as a shell profile P (represented by a broken line in FIG. 2) which is open to one side—in the mounted condition, to an underside, the shell profiles having an approximately U-shaped design. At the forward and rearward corner points of the function carrier 8, two forward fastening points 6 and two rearward fastening points 7 respectively are provided which are coordinated precisely with the position of the receiving areas 4, 5 on the undersides of the forward structure side members 3. By means of these fastening points 6, 7, the function carrier 8 can be connected in a force-transmitting manner according to the dash-doted line course in FIG. 1, from below to the forward structure side member 3. For the force-transmitting fastening of the function carrier 8 to the two forward structure side members 3, stable screwed connections are provided.

The cast material of the one-piece function carrier 8 is provided with such a ductility and toughness that it can be plastically deformed at least within certain limits. The plastic deformability of the function carrier 8 must be selected to be so high that, at the level of desired deformation areas 10 of the side member sections 9, in the event of a deformation of the forward structure side members 3, along at least a portion of the deformation path, a supplementary plastic deformation of the function carrier 8 takes place in the area of the side member sections 9, before the side member sections 9 fail because of breakage. In the illustrated embodiment, the two desired deformation areas 10 of the side member sections 9 are provided as bent areas which are offset in a Z-shape. In this case, the side member sections 9 are situated almost exactly below the forward structure side member 3. Therefore, in the event of a deformation of the forward structure side members 3, because of the force transmission by way of the fastening points 6 onto the side member sections 9, a Z-type upsetting or folding of the side member sections 9 will occur before these fail because of breakage. Naturally, the function carrier 8 can be designed to be plastically deformable also in its other areas.

In an embodiment of the invention which is not shown, the function carrier is designed as a receiving carrier for a front drive assembly. In this embodiment, the lateral side member sections are spaced such from the undersides of the forward structure side members that a sufficient space is created between the forward structure side members and the assigned side member sections of the function carrier, which space ensures a guiding-through of one forward propeller shaft respectively of the front drive assembly for receiving the wheel hubs.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Forward structure for a self-supporting body shell of a passenger car, having two forward structure side members by means of which a function carrier is directly connected to at least four fastenings points in a force-transmitting manner, the function carrier being constructed of two cross member sections and two side member sections, wherein the function carrier is designed as a one-piece component which can be deformed at least in sections, each side member section being provided with at least one geometrically caused desired deformation area which can be plastically deformed in the event of a deformation of the forward structure side members in the longitudinal direction of the vehicle.

2. Forward structure according to claim 1, wherein the cross member sections and the side member sections are provided with a U-type shell profile which is open in the downward direction in a mounted in use condition.

3. Forward structure according to claim 1, wherein the component is produced as a cast component from a metal material which has such a high ductility that, in the case of corresponding forward structure loads, plastic deformations of the cast component occur in the desired deformation areas, before the material breaks.

4. Forward structure according to claim 2, wherein the function carrier is produced as a cast component from a metal material which has such a high ductility that, in the case of corresponding forward structure loads, plastic deformations of the cast component occur in the desired deformation areas, before the material breaks.

5. Forward structure according to claim 3, wherein each side member section is provided with a bent area as the desired deformation area, which bent area is vertically offset in a Z-shape.

6. Forward structure according to claim 4, wherein each side member section is provided with a bent area as the desired deformation area, which bent area is vertically offset in a Z-shape.

7. Forward structure according to claim 1, wherein the function carrier is screwed from an underside to the forward structure side members, the lateral side member sections being positioned below the forward structure side members.

8. Forward structure according to claim 2, wherein the function carrier is screwed from an underside to the forward structure side members, the lateral side member sections being positioned below the forward structure side members.

9. Forward structure according to claim 3, wherein the function carrier is screwed from an underside to the forward structure side members, the lateral side member sections being positioned below the forward structure side members.

10. Forward structure according to claim 4, wherein the function carrier is screwed from an underside to the forward structure side members, the lateral side member sections being positioned below the forward structure side members.

11. Forward structure according to claim 5, wherein the function carrier is screwed from an underside to the forward structure side members, the lateral side member sections being positioned below the forward structure side members.

12. Forward structure according to claim 6, wherein the function carrier is screwed from an underside to the forward structure side members, the lateral side member sections being positioned below the forward structure side members.

13. A method of making a forward structure for a self-supporting body shell of a passenger car, providing two forward structure side members;

connecting a function carrier directly to the two forward structure side members by at least four fastenings points in a force-transmitting manner, the function carrier being constructed of two cross member sections and two side member sections, wherein the function carrier is designed as a one-piece component which can be deformed at least in sections, each side member section being provided with at least one geometrically caused desired deformation area which can be plastically deformed in the event of a deformation of the forward structure side members in the longitudinal direction of the vehicle.

14. A method according to claim 13, wherein the cross member sections and the side member sections are provided with a U-type shell profile which is open in the downward direction in a mounted in use condition.

15. A method according to claim 13, wherein the function carrier is produced as a cast component from a metal material which has such a high ductility that, in the case of corresponding forward structure loads, plastic deformations of the cast component occur in the desired deformation areas, before the material breaks.

16. A method according to claim 15, wherein each side member section is provided with a bent area as the desired deformation area, which bent area is vertically offset in a Z-shape.

17. A method according to claim 16, wherein the connecting includes the function carrier screwed from an underside to the forward structure side members, the lateral side member sections being positioned below the forward structure side members.

* * * * *